United States Patent
Hillier et al.

(10) Patent No.: US 11,625,902 B2
(45) Date of Patent: Apr. 11, 2023

(54) METHODS AND SYSTEMS FOR SHELL FORMATION IN 3D PRINTING

(71) Applicant: Global Graphics Software Limited, Cambridge (GB)

(72) Inventors: Kenneth Hillier, Venice, FL (US); Roger Goldsmith, Sarasota, FL (US)

(73) Assignee: GLOBAL GRAPHICS SOFTWARE LIMITED, Cambridge (GB)

( * ) Notice: Subject to any disclaimer, the term of this patent is extended or adjusted under 35 U.S.C. 154(b) by 19 days.

(21) Appl. No.: 17/397,198

(22) Filed: Aug. 9, 2021

(65) Prior Publication Data

US 2023/0041333 A1 Feb. 9, 2023

(51) Int. Cl.
*G06T 19/20* (2011.01)
*B33Y 50/00* (2015.01)
*B22F 10/80* (2021.01)
*B33Y 30/00* (2015.01)

(52) U.S. Cl.
CPC .............. *G06T 19/20* (2013.01); *B22F 10/80* (2021.01); *B33Y 50/00* (2014.12); *B33Y 30/00* (2014.12); *G06T 2219/2012* (2013.01)

(58) Field of Classification Search
CPC .......... G06T 19/20; B22F 10/80; B33Y 30/00; B33Y 50/00
See application file for complete search history.

(56) References Cited

U.S. PATENT DOCUMENTS

| | | | |
|---|---|---|---|
| 5,104,592 A * | 4/1992 | Hull | B44B 1/006 427/430.1 |
| 6,031,544 A * | 2/2000 | Yhann | G06T 7/12 345/620 |
| 2017/0061037 A1* | 3/2017 | Makem | G06F 30/23 |
| 2017/0136699 A1* | 5/2017 | Erb | B29C 64/165 |
| 2019/0279054 A1* | 9/2019 | Morovic | H04N 1/00031 |
| 2019/0294754 A1* | 9/2019 | Roberts | G06F 30/17 |
| 2021/0053741 A1* | 2/2021 | Barfoot | F25C 5/182 |

* cited by examiner

*Primary Examiner* — Charles Tseng
(74) *Attorney, Agent, or Firm* — Branch Partners PLLC; Bruce E. Black

(57) ABSTRACT

A method for generating or enhancing a shell for a printed three-dimensional (3D) object includes converting a 3D print file representing the 3D object to at least one vector file representing the 3D object; using a vector trapping algorithm on the at least one vector file to generate or enhance the shell in the at least one vector file; processing the at least one vector file with the shell to produce at least one rasterized vector file; and printing, using the at least one rasterized vector file, the 3D object with the shell.

20 Claims, 6 Drawing Sheets

METHODS AND SYSTEMS FOR SHELL FORMATION IN 3D PRINTING

FIELD

The present invention is directed to the area of 3D printing. The present invention is also directed to methods and systems for shell formation for 3D printed objects.

BACKGROUND

At least some types of 3D printing use two or three structural compositions with different material densities—a) shell and infill or b) shell, solid, and infill. The shell forms the exterior surface of a printed object. The shell is typically formed using a higher density of material than in-fill in the interior of the printed object. The shell generally makes the 3D printed object stronger. Formation of the shell is part of the printing instructions or added by the user or printer. However, there can be challenges in defining or forming the shell in the print file(s).

BRIEF SUMMARY

One embodiment is a method for generating or enhancing a shell for a printed three-dimensional (3D) object. The method includes converting a 3D print file representing the 3D object to at least one vector file representing the 3D object; using a vector trapping algorithm on the at least one vector file to generate or enhance the shell in the at least one vector file; processing the at least one vector file with the shell to produce at least one rasterized vector file; and printing, using the at least one rasterized vector file, the 3D object with the shell.

Another embodiment is a system for printing a three-dimensional (3D) object. The system includes a 3D printing device; and at least one processor coupled to the 3D printing device and configured and arranged to perform actions. The actions include converting a 3D print file representing the 3D object to at least one vector file representing the 3D object; using a vector trapping algorithm on the at least one vector file to generate or enhance the shell in the at least one vector file; processing the at least one vector file with the shell to produce at least one rasterized vector file; and directing the 3D printing device to print the 3D object with the shell using the at least one rasterized vector file.

A further embodiment is a non-transitory computer-readable medium having processor-executable instructions for generating or enhancing a shell for a printed three-dimensional (3D) object, the processor-executable instructions when installed onto a device enable the device to perform actions. The actions include converting a 3D print file representing the 3D object to at least one vector file representing the 3D object; using a vector trapping algorithm on the at least one vector file to generate or enhance the shell in the at least one vector file; processing the at least one vector file with the shell to produce at least one rasterized vector file; and printing, using the at least one rasterized vector file, the 3D object with the shell.

In at least some embodiments, converting the 3D print file includes slicing the 3D print file to generate the at least one vector file, wherein each slice is a page of the at least one vector file. In at least some embodiments, using the vector trapping algorithm includes adding a colored background area over the at least one vector file and using the vector trapping algorithm to identify shell-zone stroke areas between the colored background area and at least one portion of the at least vector file representing the 3D object. In at least some embodiments, using the vector trapping algorithm includes using the vector trapping algorithm to identify shell-zone stroke areas as boundaries in the at least one vector file representing the 3D object.

In at least some embodiments, using the vector trapping algorithm includes generating or enhancing the shell to extend inwardly from an exterior surface of the 3D object. In at least some embodiments, using the vector trapping algorithm includes generating or enhancing the shell to be disposed on an exterior surface of the 3D object.

In at least some embodiments, the method or the actions further include adding at least one additional layer to the shell to form a multi-layer shell. In at least some embodiments, at least one of the at least one additional layer differs in material composition from the shell. In at least some embodiments, the at least one additional layer is an insulative layer which separates the shell from in-fill within the 3D object.

In at least some embodiments, the method or the actions further include receiving, from a user, a direction to not produce a shell for features having a size less than or equal to a user-selected size, wherein using the vector trapping algorithm includes not generating or enhancing a shell for the features of the 3D object having a size less than or equal to the user-selected size.

In at least some embodiments, the method or the actions further include receiving, from a user, a direction to not produce a shell for a user-defined zone in the at least one vector file, wherein using the vector trapping algorithm includes not generating or enhancing a shell within the user-defined zone of the at least one vector file.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of document processing and printing. The present invention is also directed to methods and systems for emulation of spot inks or other colorants.

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The following detailed description is, therefore, not to be taken in a limiting sense. The methods described herein can be performed using any type of processor and any suitable type of device that includes a processor.

Figure 1:
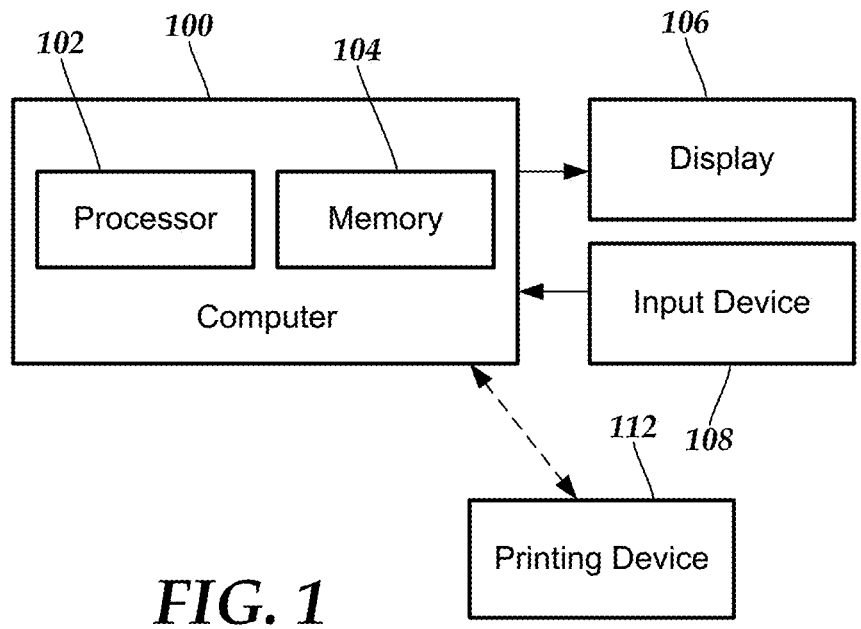
FIG. 1 is a schematic block diagram of one embodiment of a system for processing documents for printing, according to the invention.
Figure 7A:
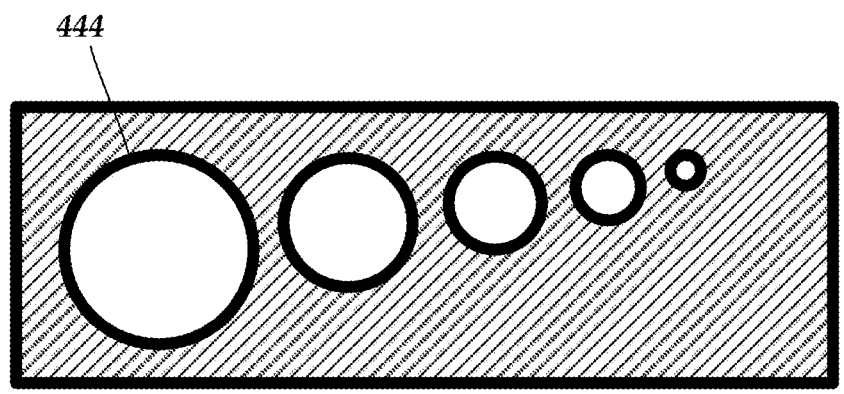
FIG. 7A is a schematic illustration of application of a shell to features of a representation of an object for 3D printing, according to the invention.
Figure 7B:
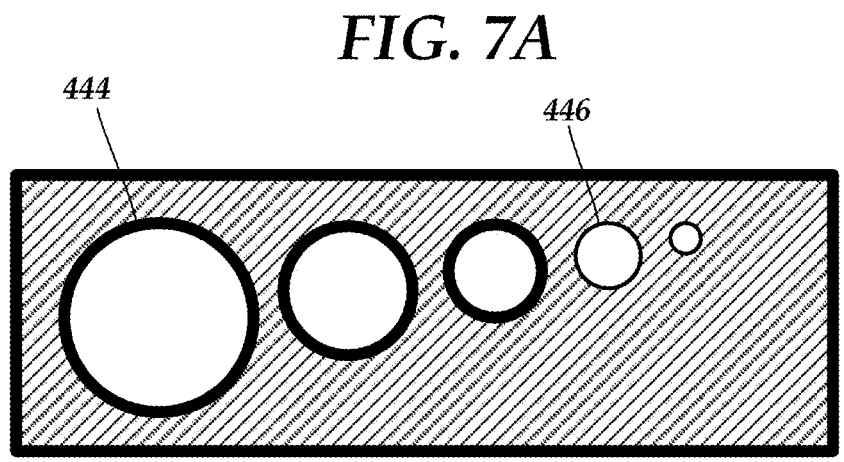
FIG. 7B is a schematic illustration of application of a shell to only some features of a representation of an object for 3D printing based on selection of a small feature option, according to the invention.

FIG. 1 illustrates one embodiment of a system for practicing the invention. The system can include a computer 100 or any other device that includes a processor 102 and a memory 104, a display 106, an input device 108, and a 3D printing device 112, such as a 3D printer. In at least some embodiments, one or more of the computer 100, display 106, or input device 108 can be part of the 3D printing device 112.

The computer 100 can be a laptop computer, desktop computer, server computer, tablet, mobile device, smartphone, or other devices that can run applications or programs, or any other suitable device for processing information and for presenting a user interface. Alternatively or additionally, the computer 100 can be part of the 3D printing device 112 or coupled (by wired or wireless coupling) to the 3D printing device. The computer 100 can be local to the user or can include components that are non-local to the user including one or both of the processor 102 or memory 104 (or portions thereof). For example, in some embodiments, the user may operate a terminal that is connected to a non-local computer. In other embodiments, the memory can be non-local to the user.

The computer 100 can utilize any suitable processor 102 including one or more hardware processors that may be local to the user or non-local to the user or other components of the computer. The processor 102 is configured to execute instructions provided to the processor, as described below.

Any suitable memory 104 can be used for the computer 100. The memory 104 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, cloud storage, or any other medium which can be used to store the desired information and which can be accessed by a computer.

Communication methods provide another type of computer readable media; namely communication media. Communication media typically embodies computer-readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

The display 106 can be any suitable display device, such as a monitor, screen, display, or the like. The input device 108 can be, for example, a keyboard, mouse, touch screen, track ball, joystick, voice recognition system, or any combination thereof, or the like and can be used by the user to interact with a user interface.

Figure 2A:
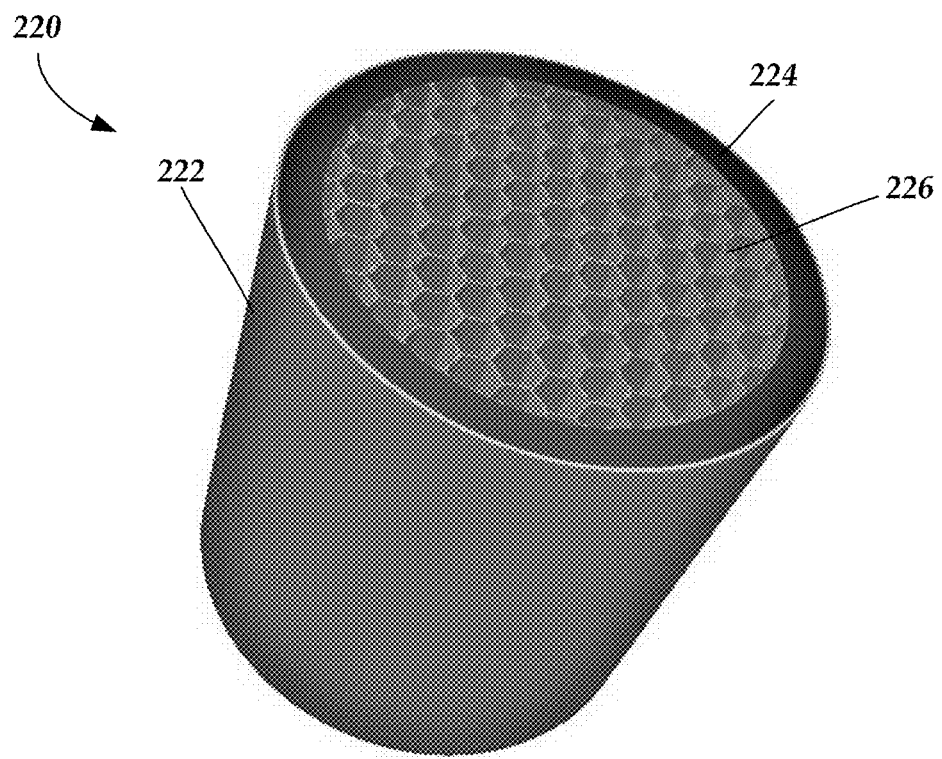
FIG. 2A is a schematic, perspective view of one embodiment of a 3D printed object.
Figure 2B:
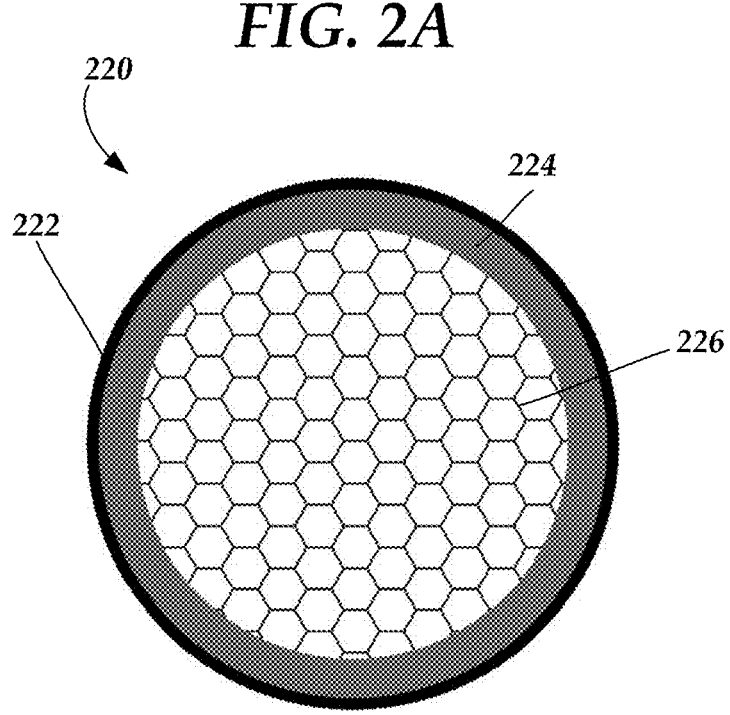
FIG. 2B is a schematic, cross-sectional view of the 3D printed object of FIG.

Many types of 3D printing use two or three structural compositions for printing a 3D object—a) shell and infill orb) shell, solid, and infill. FIGS. 2A and 2B illustrate one embodiment of a 3D printed object 220 with a shell 222, a solid layer 224 (which can also correspond to another shell layer or to infill at 100%), and infill 226. It will be understood that other 3D printed objects may eliminate the solid layer 224 or infill 226 (for example, infill set at 0%).

In at least some embodiments, the shell 222 can be described using parameters such as thickness, material density, material choice, or the like or any combination thereof. In at least some embodiments, the shell 222 can include multiple shell layers which may be formed using the same or different parameters (for example, thickness or density) and the same or different materials. The systems and methods described herein can be used to form a shell 222 or to enhance the shell (for example, increasing the thickness of the shell or adding one or more layers.)

Methods and techniques used in 2D printing can enhance or improve 3D printing. In 2D printing, gray levels can represent visual density. In 3D printing, gray levels can be used to represent density of mass. For example, gray level 4 or 100% gray level can represent the relatively high density shell 222, gray level 3 or 70% (or 67% or 66.6%) gray level can represent a lower density solid layer 224 (or a higher density infill 226), gray level 2 or 30% (or 33% or 33.3%) gray level can represent the relatively low density infill 226, and gray level 1 or 0% gray level can represent the absence of printing material (for 0% infill). It will be understood that more than four gray levels can be used.

Similarly, gray level 4 can correspond to delivery of a large drop of printing material, gray level 3 can correspond to delivery of a medium drop of printing material, gray level 2 can correspond to delivery of small drop of printing material, and gray level 1 can correspond to no delivery of printing material.

The term "gray level" is used herein but can be replaced by other suitable term such as, for example, "drop size", "level", "percentage", or the like. In at least some embodiments, specifying gray levels in a vector PDF slice file can be used to control drop size and in effect, density of the printed material.

In at least some embodiments, the 3D printing file (for example, an STL file) can be converted to one or more vector files (for example, one or more PDF vector files) to facilitate vector trapping, shell formation or enhancement, file manipulation, or a rasterization process or any combination thereof. In at least some embodiments, the 3D print file (for example, a STL file) is sliced into one or more vector files (for example, PDF vector files). In at least some embodiments, each page of a vector file represents one slice from the 3D print file. In at least some embodiments, X and Y coordinates can be refer to orthogonal coordinates (for example, length and width coordinates) on the page of the vector file and the Z coordinate can be a page or a page range within the vector file.

Figure 3:
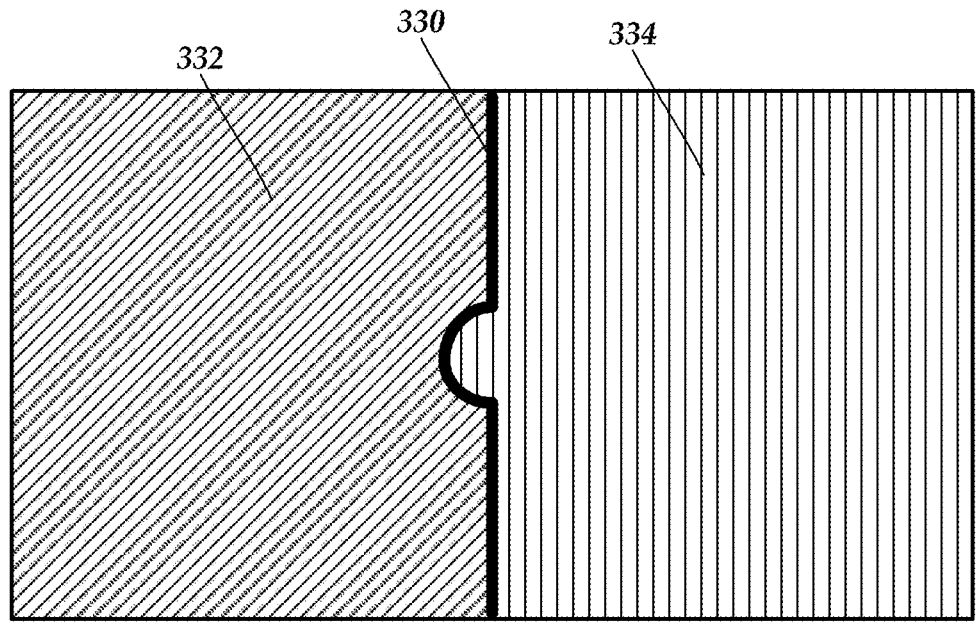
FIG. 3 is a schematic illustration of one method of vector trapping for 2D printed elements.

In 2D printing, vector trapping is commonly used on multicolor analog printing presses to eliminate unintended gaps between colors due to, for example, mechanical misregistration or other printing issues. Vector trapping can be applied to raster or vector prepress files. Vector trapping hides the misregistration by enlarging or reducing the dimensions of the intersection areas. This creates an overlap or underlap which effectively compensates for the misregistration. The vector trapping algorithm analyzes objects in the print file and creates a trapzone stroke area which is used to produce the overlap or underlap effect. FIG. 3 illustrates one example of a trapzone stroke area 330 between two colored areas 332, 334 with each colored area having a different color.

In at least some instances, the trapzone stroke area 330 can be centered on the intersection of both colored areas 332, 334. In at least some instances, centering can cause a slight increase to the area of each colored area 332, 334 to produce the overlap.

Alternatively, a trapzone stroke area 330 can be added to only one of the colored areas 332. This method will increase the area of only one of the two colored areas, leaving the other color area's size unaffected.

Figure 4A:
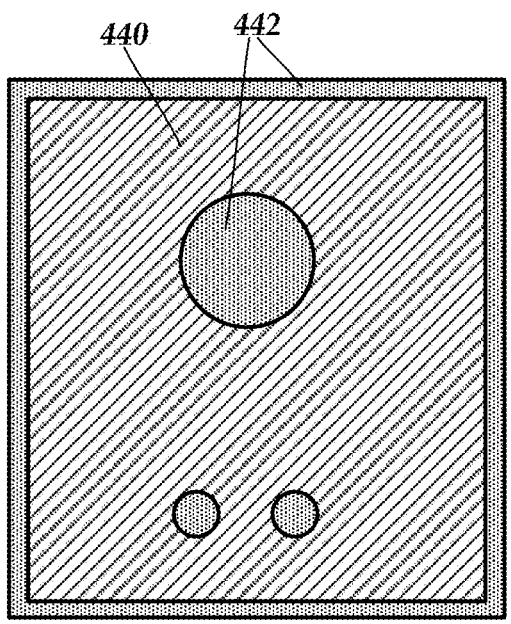
FIG. 4A is a schematic illustration of one embodiment of a vector file representing a slice of an object for 3D printing and a colored background around that object.

The concept of vector trapping can be applied to 3D printing to generate or enhance a shell 222 (FIG. 2) of a 3D printed object. One method for generating or enhancing a shell 222 (FIG. 2) is a trapping method. In at least some embodiments, a temporary, colored background area 442 is added outside the perimeter of the object 440 to be printed, as illustrated in FIG. 4A. In at least some embodiments of the trapping method, the colored background area 442 is added to the vector file(s) generated from the 3D print file.

Figure 4B:
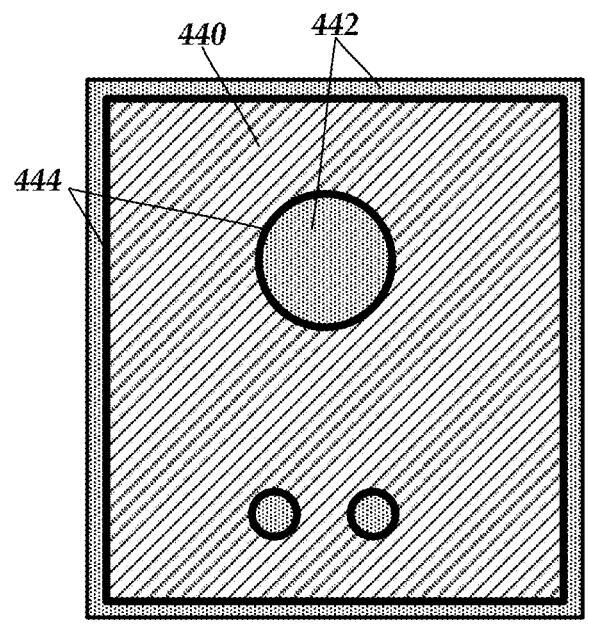
FIG. 4B is a schematic illustration of a shell applied to the representation of the object of FIG. 4A using a trapping method, according to the invention.

The addition of the colored background area 442 provides two intersecting colors which a vector trapping algorithm uses to create a shell-zone stroke area 444 (similar to the trapzone stroke area 330 of FIG. 3), as illustrated in FIG. 4B. The resulting shell-zone stroke area 444 can be used to form the shell 222 (FIG. 2), form a portion of the shell, or expand the shell. Vector trapping algorithms are well-known and any suitable vector trapping algorithm can be used including those employed in raster image processing software and document creation software.

In at least some embodiments, the shell-zone stroke area 444 extends inwardly from the exterior surfaces of the object 440 to maintain dimensional accuracy. Alternatively, in at least some embodiments, the shell-zone stroke area 444 can be added to the existing exterior surfaces to produce a slight enlargement of the dimensions of the object 440.

Figure 5:
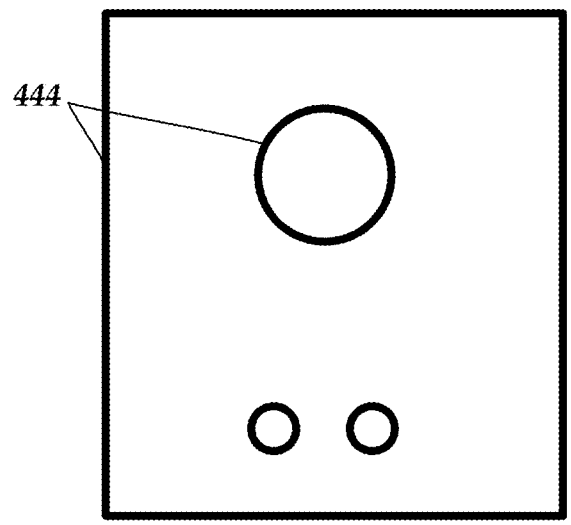
FIG. 5 is a schematic illustration of a shell applied to the representation of the object of FIG. 4A using an object stoke method, according to the invention.
Figure 8:
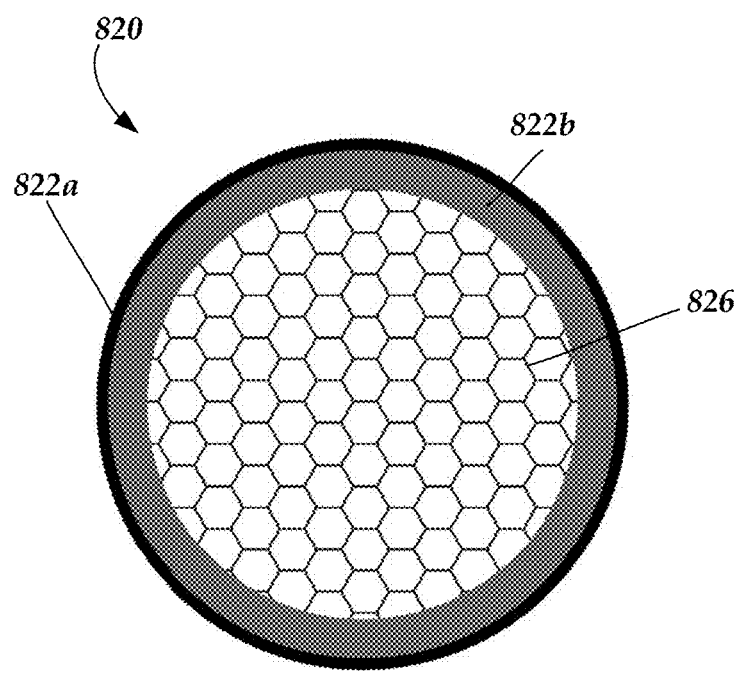
FIG. 8 is a schematic cross-sectional view of one embodiment of a 3D printed object with a multi-layer shell, according to the invention.

Another method for generating or enhancing a shell 222 (FIG. 2) of a 3D printed object is an object stroke method. In the object stroke method, the vector trapping algorithm is altered so that a shell-zone stroke area 444 is generated and applied to all objects of specific values, as illustrated in FIG. 5 (based on the object 440 in FIG. 4A.) As an example, the shell-zone stroke area 444 can be applied to boundaries of an object which has a grayscale value of 2 to 3 in the scale presented above 30-70% (or, for example, 30 to 70% in a percentage scale) or a grayscale value of at least 2 (or at least 30% in a percentage scale). These values or ranges represent portions of the object, whereas lower values represent regions outside of the object. In at least some embodiments, this alteration of the vector trapping algorithm can eliminate the addition of a temporary colorant to the background of the object and may improve processing performance. As with the trapping method, the shell-zone stroke 444 can be generate or enhance a shell that can extend inwardly from, or be positioned on, the exterior surfaces of the object.

Figure 6:
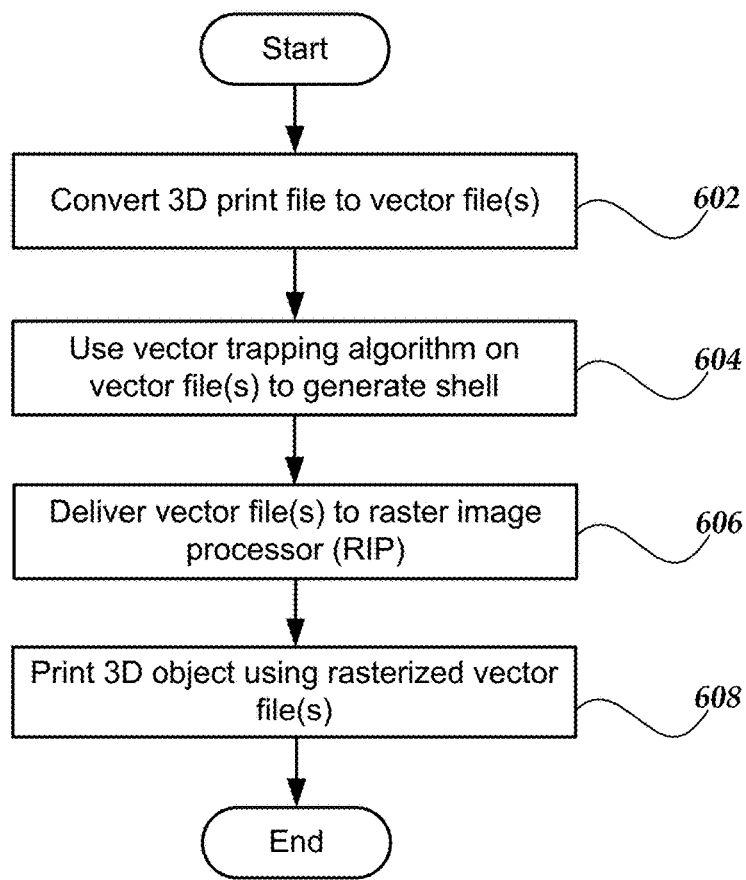
FIG. 6 is a schematic flowchart of one embodiment of a method of generating or enhancing a shell for a printed three-dimensional (3D) object, according to the invention.

FIG. 6 is a flowchart of one embodiment of a method of generating or enhancing a shell for a 3D printed object. In step 602, the 3D print file (for example, a STL file) is converted into one or more vector files (for example, PDF vector files.) In at least some embodiments, the 3D print file can be sliced into the one or more vector files. In at least some embodiments, each page of a vector file represents one slice.

In step 604, the vector file(s) are processed using a vector trapping algorithm to generate or enhance a shell for the object to be printed. The trapping method or object stroke method described above can be used. Any suitable trapping algorithm can be used. In at least some embodiments, the system or method can include the presentation of an interface, such as interface 980 of FIG. 9A, in which a user can select one or more controls to select or alter shell parameters, such as a thickness control 982 to select or alter thickness of the shell, a material control 984 to select material for the shell, or a density control 986 to select a density or drop size for the shell, or the like or any combination thereof.

In step 606, the vector file(s) are delivered to a raster image processor (RIP) for rasterization. The RIP outputs a raster file for each page/slice where each pixel represents shell, solid, in-fill, or no material. As an example, the gray level or gray level percentages described above can be used in the raster file for designating shell, solid, in-fill, or no material.

In step 608, the 3D printer utilizes the raster file to control material delivery (e.g., drop size) during the 3D printing process. The 3D printer prints the object with the shell generated or enhanced using this method.

One or more additional options can be added to the systems and methods of generating or enhancing a shell for a 3D printed object. In at least some embodiments, small feature protection can be implemented in the systems or methods for generating or enhancing a shell for a 3D printed object. In 2D printing, it can be undesirable to apply trapping to small objects such as type as it can make those features thinner or fatter than originally intended. Similarly, in 3D printing, it can be undesirable to apply the shell to small feature areas as the shell may result in issues such as, for example, slow drying, sagging, or substantially altering the dimensions of the small features.

In at least some embodiments, the methods and systems for generating or enhancing a shell can include a control, setting, or option allowing a user to specify a minimum size of features to which a shell will be applied. The minimum size can be specified in terms of a minimum area, volume, diameter, perimeter, distance across the feature, or the like or any combination thereof. The size may be measured using the original 3D print file or measured for a particular page of a vector file or for all (or a subset) of the pages of the vector file(s). For example, the user may specify that objects smaller than a 25 mm² area (5 mm×5 mm) will be exempted from shell formation. For example, the area that is considered for the feature may be the largest area for that feature on any page of the vector file(s).

In at least some embodiments, the methods and systems for generating or enhancing a shell can include a control (for example, small feature control 988 in interface 980 of FIG. 9A), setting, or option allowing a user to manually select or otherwise identify specific features to which a shell will not be applied. This may be in addition to the minimum size control, setting, or option described above.

Another optional feature can be variation in the rules for application of the shell for different portions of the object. In 2D printing, in at least some instances, it is possible to apply different trapping rules in different areas of the image. In at least some embodiments, in 3D printing, a user can specify zones of the vector file(s) in which the rules for shell formation can be different. For example, in one or more zones, the user can specify that no shell is generated. As another example, in one or more zones, different shell parameters (for example, thickness or in/on the exterior surface) are used for formation of the shell. In at least some embodiments, each shell zone can be described in three dimensions where X and Y are specified in 2D space for X and Y coordinates of the vector file, and the Z coordinate can be a page or a page range to control the depth of the shell zone.

Figure 9A:
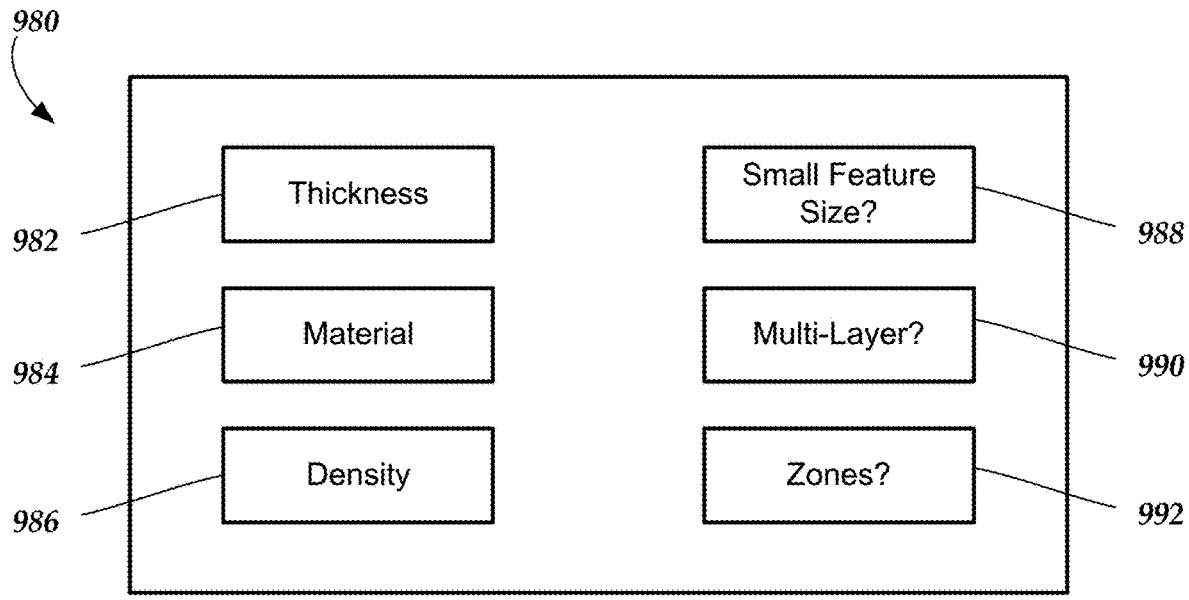
FIG. 9A is a schematic illustration of one embodiment of a user interface for systems or methods generating or enhancing a shell for a printed three-dimensional (3D) object, according to the invention.
Figure 9B:
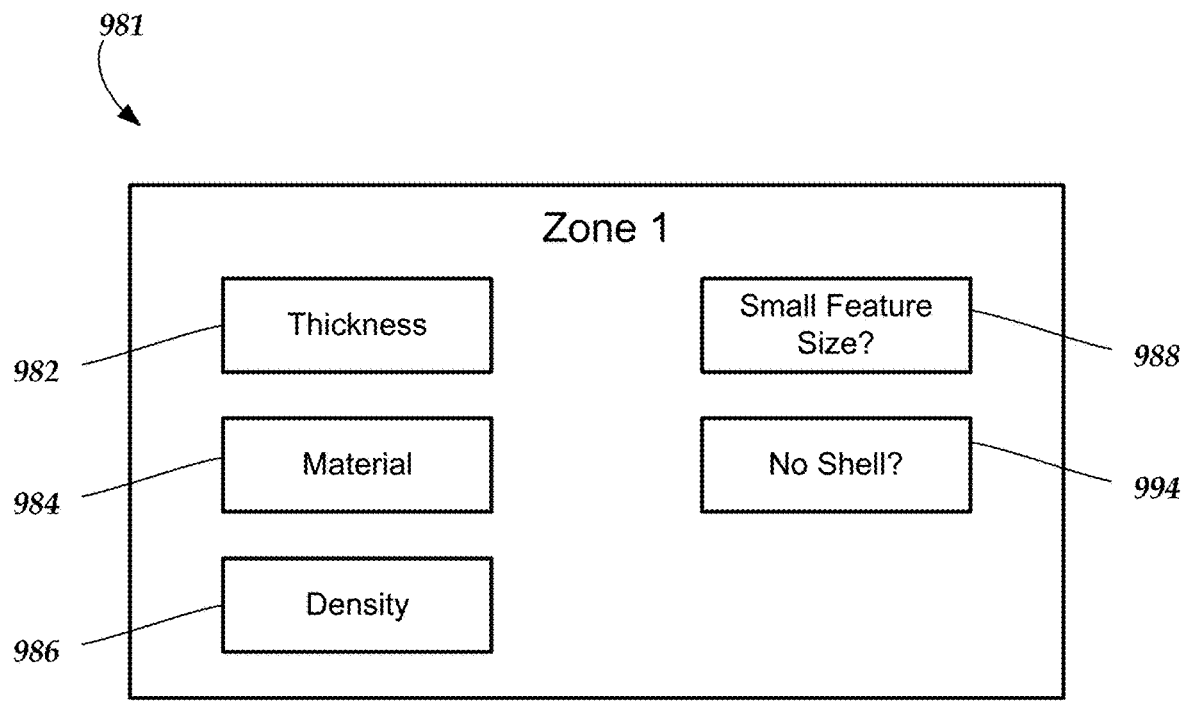
FIG. 9B is a schematic illustration of one embodiment of a user interface for one zone of an object, according to the invention.

The interface 980 of FIG. 9A illustrates a control 992 allowing a user to define multiple zones. The system or method can then include an interface of the user to define the zones in the vector file(s) or the pages of the vector file(s). In addition, the system or method can provide the interface 981 of FIG. 9B for each zone which includes a thickness control 982, a material control 984, a density control 986, and a small feature control 988 that are similar to those described for interface 980 but apply only to a particular zone. In addition, the interface 981 includes a no shell control 994 that indicates that no shell should be printed for that zone.

Another optional feature allows for multi-layer shells. In at least some embodiments, the systems and methods include controls, settings, or options to generate a multi-layer shell. The multi-layer shell can have two, three, four, or more layers. In at least some embodiments, each layer can be the same or different from other layers. For example, the layers can be generated using different drop sizes, different numbers of drops, or different fluids/materials or the like or any combination thereof. This can result in shell layers made of different materials or having different thicknesses or densities or the like or any combination thereof.

In at least some embodiments, at least one additional layer can be added to the shell generated or enhanced as described above which corresponds to an initial layer of the multi-layer shell. In at least some embodiments, the additional layer(s) can be added over the initial layer, below the initial layer, or any combination thereof. In at least some embodiments, the additional layer(s) can be a division of the initial layer into two or more layers. The division can provide layers that are equal in thickness or unequal in thickness (in which case, in at least some embodiments, a user can select the thicknesses of the layers).

In at least some embodiments, the systems or methods can utilize two separate channels of the 3D printing device for forming different layers of the shell. As an example, a two-layer shell may print two drops of material for the inner shell layer and three drops of material for the outer shell layer. As another example, a two-layer shell may print three drops of a first fluid for the inner shell and three drops of a second fluid for the outer shell. In at least some embodiments, the thickness of each of the shell layers can also be selected. For example, the outer shell can have a thickness of 1 mm and inner shell can have a thickness of 3 mm.

In at least some embodiments, a multi-layer shell can provide an isolation layer between the outer shell layer and the solid/in-fill. This can be useful, for example, to prevent or reduce chemical or functional interaction of the solid/infill material with the outer shell material. This can also be useful when the materials of the solid/infill and the outer shell are conductive by providing an insulative material between the conductive solid/infill and conductive the outer shell.

Figure 9C:
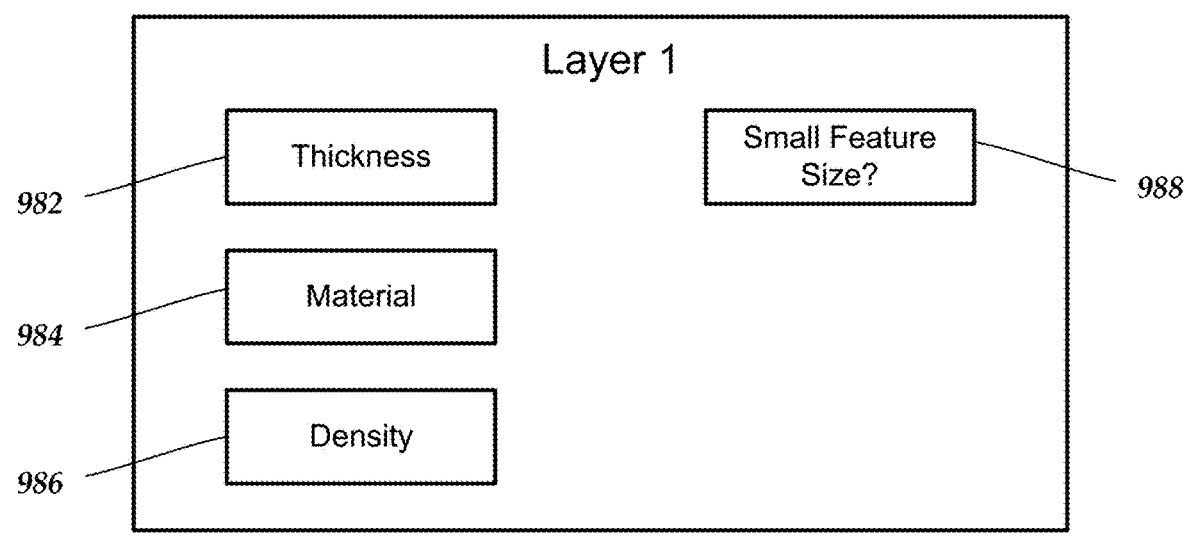
FIG. 9C is a schematic illustration of one embodiment of a user interface for one layer of an object, according to the invention.

The interface 980 of FIG. 9A illustrates a control 990 allowing a user to select a multi-layer shell. The system or method can provide the interface 983 of FIG. 9C for each layer which includes a thickness control 982, a material control 984, a density control 986, and a small feature control 988 that are similar to those described for interface 980 but apply only to a particular shell.

Optionally, the methods and systems can be arranged so that the generation or enhancement of the shell does not change the dimensions of the object. In at least some embodiments, it is not desirable for the shell to increase the overall exterior dimensions of a 3D printed object. In at least some embodiments, the shell is formed inside the exterior dimensions of the object.

Another option allows for increasing or decreasing the overall size of the object by adding to or subtracting from the dimensional size of the shell. For example, in 3D printing using the binder jetting process for metal materials, the object may become slightly reduced in size during the subsequent sintering process. To compensate for this shrinkage a shell can be added onto all exterior surfaces of the object. The effect is similar to chrome or copper plating by electrochemical addition. As an example, if the object will lose 0.5% of the object's size in the binder jetting printing and sintering process, a shell with a thickness equivalent to 0.5% of the object can be added. This can result in the object's size meeting the originally intended dimensions.

It will be understood that each block of the flowchart illustrations, and combinations of blocks in the flowchart illustrations and methods disclosed herein, can be implemented by computer program instructions. These program instructions may be provided to a processor to produce a machine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computer system. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium (which may be local or nonlocal to the computer) which can be used to store the desired information and which can be accessed by a computer.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A method for generating or enhancing a shell for a printed three-dimensional (3D) object for printing, the method comprising:
    converting a 3D print file representing the 3D object to at least one initial vector file representing the 3D object;
    using a vector trapping algorithm on the at least one initial vector file to generate or enhance the shell in the at least one initial vector file and to identify shell-zone stroke areas as boundaries in the at least one initial vector file representing the 3D object;
    processing the at least one initial vector file with the shell to produce at least one rasterized vector file; and
    printing, using the at least one rasterized vector file, the 3D object with the shell.

2. The method of claim 1, wherein converting the 3D print file comprises slicing the 3D print file to generate the at least one initial vector file, wherein each slice is a page of the at least one initial vector file.

3. The method of claim 1, wherein using the vector trapping algorithm comprises adding a colored background area over the at least one initial vector file and using the vector trapping algorithm to identify the shell-zone stroke areas between the colored background area and at least one portion of the at least one initial vector file representing the 3D object.

4. The method of claim 1, wherein using the vector trapping algorithm comprises using the vector trapping algorithm to identify the shell-zone stroke areas, based on grayscale values, as the boundaries in the at least one initial vector file representing the 3D object.

5. The method of claim 1, wherein using the vector trapping algorithm comprises generating or enhancing the shell to extend inwardly from an exterior surface of the 3D object.

6. The method of claim 1, wherein using the vector trapping algorithm comprises generating or enhancing the shell to be disposed on an exterior surface of the 3D object.

7. The method of claim 1, further comprising adding at least one additional layer to the shell to form a multi-layer shell.

8. The method of claim 7, wherein at least one of the at least one additional layer differs in material composition from another layer of the multi-layer shell.

9. The method of claim 7, wherein the at least one additional layer is an insulative layer which separates the multi-layer shell from in-fill within the 3D object.

10. The method of claim 1, further comprising receiving, from a user, a direction to not produce the shell for features having a size less than or equal to a user-selected size, wherein using the vector trapping algorithm comprises not generating or enhancing the shell for the features of the 3D object having the size less than or equal to the user-selected size.

11. The method of claim 1, further comprising receiving, from a user, a direction to not produce the shell for a user-defined zone in the at least one initial vector file, wherein using the vector trapping algorithm comprises not generating or enhancing the shell within the user-defined zone of the at least one initial vector file.

12. A system for printing a three-dimensional (3D) object, the system comprising:
    a 3D printing device; and
    at least one processor coupled to the 3D printing device and configured and arranged to perform actions, the actions comprising:
        converting a 3D print file representing the 3D object to at least one initial vector file representing the 3D object;
        using a vector trapping algorithm on the at least one initial vector file to generate or enhance the shell in the at least one initial vector file and to identify shell-zone stroke areas as boundaries in the at least one initial vector file representing the 3D object;
        processing the at least one initial vector file with the shell to produce at least one rasterized vector file; and
        directing the 3D printing device to print the 3D object with the shell using the at least one rasterized vector file.

13. The system of claim 12, wherein converting the 3D print file comprises slicing the 3D print file to generate the at least one initial vector file, wherein each slice is a page of the at least one initial vector file.

14. The system of claim 12, wherein using the vector trapping algorithm comprises adding a colored background area over the at least one initial vector file and using the vector trapping algorithm to identify the shell-zone stroke areas between the colored background area and at least one portion of the at least one initial vector file representing the 3D object.

15. The system of claim 12, wherein using the vector trapping algorithm comprises using the vector trapping algorithm to identify the shell-zone stroke areas, based on grayscale values, as the boundaries in the at least one initial vector file representing the 3D object.

16. A non-transitory computer-readable medium having processor-executable instructions for generating or enhancing a shell for a three-dimensional (3D) object for printing, the processor-executable instructions when installed onto a device enable the device to perform actions, the actions comprising:
    converting a 3D print file representing the 3D object to at least one initial vector file representing the 3D object;
    using a vector trapping algorithm on the at least one initial vector file to generate or enhance the shell in the at least one initial vector file and to identify shell-zone stroke areas as boundaries in the at least one initial vector file representing the 3D object;
    processing the at least one initial vector file with the shell to produce at least one rasterized vector file; and printing, using the at least one rasterized vector file, the 3D object with the shell.

17. The non-transitory computer-readable medium of claim 16, wherein converting the 3D print file comprises slicing the 3D print file to generate the at least one initial vector file, wherein each slice is a page of the at least one initial vector file.

18. The non-transitory computer-readable medium of claim 16, wherein using the vector trapping algorithm comprises adding a colored background area over the at least one initial vector file and using the vector trapping algorithm to identify the shell-zone stroke areas between the colored background area and at least one portion of the at least one initial vector file representing the 3D object.

19. The non-transitory computer-readable medium of claim 16, wherein using the vector trapping algorithm comprises using the vector trapping algorithm to identify the shell-zone stroke areas, based on grayscale values, as the boundaries in the at least one initial vector file representing the 3D object.

20. The non-transitory computer-readable medium of claim 16, wherein the actions further comprise adding at least one additional layer to the shell to form a multi-layer shell.

\* \* \* \* \*